US009021839B2

(12) United States Patent
Lee et al.

(10) Patent No.: US 9,021,839 B2
(45) Date of Patent: May 5, 2015

(54) MOTOR FOR WASHING MACHINE AND WASHING MACHINE HAVING THE SAME

(75) Inventors: Jong Jin Lee, Choonan-si (KR); Woon Yong Lee, Suwon-si (KR); Myong Gui Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 964 days.

(21) Appl. No.: 13/064,691

(22) Filed: Apr. 8, 2011

(65) Prior Publication Data

US 2011/0247375 A1 Oct. 13, 2011

(30) Foreign Application Priority Data

Apr. 9, 2010 (KR) ........................ 10-2010-0032716

(51) Int. Cl.

| | |
|---|---|
| ***D06F 13/00*** | (2006.01) |
| ***H02K 3/52*** | (2006.01) |
| *H02K 1/32* | (2006.01) |
| *H02K 9/04* | (2006.01) |
| *H02K 21/22* | (2006.01) |

(52) U.S. Cl.
CPC *H02K 3/522* (2013.01); *H02K 1/32* (2013.01); *H02K 9/04* (2013.01); *H02K 21/22* (2013.01)

(58) Field of Classification Search
CPC ..... D06F 37/206; D06F 37/269; D06F 37/30; D06F 37/20; H02K 1/187; H02K 1/2786; H02K 1/148; H02K 1/30
USPC .......... 68/140, 3 R, 12.24, 12.12; 310/43, 71, 310/114, 91
See application file for complete search history.

(56) References Cited

U.S. PATENT DOCUMENTS

| | | | | |
|---|---|---|---|---|
| 7,271,512 | B2 * | 9/2007 | Lee et al. | 310/43 |
| 7,687,969 | B2 * | 3/2010 | Kim et al. | 310/266 |
| 2005/0189836 | A1 | 9/2005 | Lee et al. | |

FOREIGN PATENT DOCUMENTS

| | | |
|---|---|---|
| CN | 1954110 | 4/2007 |
| KR | 10-2005-0087280 | 8/2005 |
| KR | 10-0669025 | 1/2007 |
| KR | 10-2007-0014422 | 2/2007 |
| KR | 10-2008-0076056 | 8/2008 |

OTHER PUBLICATIONS

Chinese Office Action dated Jun. 5, 2014 in corresponding Chinese Patent Application No. 201110062329.7.
Chinese Decision on Grant issued Dec. 18, 2014 in corresponding Chinese Patent Application No. 201110062329.7.

* cited by examiner

*Primary Examiner* — Michael Barr
*Assistant Examiner* — Thomas Bucci
(74) *Attorney, Agent, or Firm* — Staas & Halsey LLP

(57) ABSTRACT

A motor for washing machines having a first insulator of the motor which surrounds a lower portion of a stator core of a stator of the motor and includes a ring-shaped mounting unit including a plurality of connection bosses so as to mount the stator on a tub of a washing machine, and at least one heat dissipation hole is provided on the mounting unit, thereby improving a cooling effect of the stator core.

13 Claims, 6 Drawing Sheets

MOTOR FOR WASHING MACHINE AND WASHING MACHINE HAVING THE SAME

CROSS-REFERENCE TO RELATED APPLICATIONS

This application claims the benefit of Korean Patent Application No. 2010-0032716, filed on Apr. 9, 2010 in the Korean Intellectual Property Office, the disclosure of which is incorporated herein by reference.

BACKGROUND

1. Field

Embodiments relate to a motor to drive a drum of a washing machine.

2. Description of the Related Art

In general, a washing machine is an apparatus serving to wash laundry using electric power, and includes a tub to store washing water, a drum rotatably installed in the tub, and a motor to rotate the drum.

When the drum is rotated by the motor under the condition that laundry and washing water containing a detergent are placed in the drum, contaminants are removed from the laundry through friction of the laundry with the drum and the washing water containing the detergent.

Washing machines are divided into an indirect drive type in which driving force of a motor is transmitted to a drum through a power transmission unit, such as a belt and a pulley, and a direct drive type in which driving force of a motor is directly transmitted to a shaft of a drum.

A motor of a direct drive type washing machine includes a stator mounted on a tub, and a rotor arranged around the stator and electromagnetically interacting with the stator.

SUMMARY

Therefore, it is an aspect to provide a motor for washing machines in which a heat dissipation structure is improved, and a washing machine having the same.

Additional aspects will be set forth in part in the description which follows and, in part, will be apparent from the description, or may be learned by practice of the invention.

In accordance with one aspect, in a motor for washing machines with a stator mounted on a tub of a washing machine, the stator includes a stator core including a base and teeth arranged along the outer circumferential surface of the base and separated from each other, a first insulator arranged on the lower surface of the stator core, and including a core receiving unit to receive the stator core, and a mounting unit extended from the core receiving unit inwardly in the radial direction of the stator to mount the stator on the tub and provided with at least one heat dissipation hole, and a second insulator arranged on the upper surface of the stator core, and including a cover to cover the base and teeth receiving parts corresponding to the teeth.

An inner diameter of the cover may be greater than an inner diameter of the mounting unit.

A length of the cover protruded inwardly in the radial direction of the stator may be smaller than a length of the mounting unit protruded inwardly in the radial direction of the stator.

The mounting unit may include a plurality of connection bosses arranged in the circumferential direction of the mounting unit and separated from each other, and the plurality of connection bosses may be extended up to the tub and supported by the tub when the stator is mounted on the tub.

The at least one heat dissipation hole may be arranged between the plurality of connection bosses.

The mounting unit may further include at least one reinforcing rib formed in the circumferential direction of the stator.

The core receiving unit may include a support rib to support the inner surface of the base, and the mounting unit may further include radial reinforcing ribs to connect the support rib and the plurality of connection bosses.

The mounting unit may further include connection ribs to connect the support rib and the at least one reinforcing rib formed in the circumferential direction of the stator.

The mounting unit may further include a plurality of positioning bosses arranged at positions adjacent to the plurality of connection bosses so as to be connected with the second insulator, and connection parts connected with the plurality of positioning bosses may be provided on the cover.

The tub may be provided with a plurality of guide protrusions protruded from a rear wall of the tub, and a plurality of guide holes to receive the plurality of guide protrusions may be provided on the cover.

The guide holes may be exposed to the outside through the at least one heat dissipation hole, if the first insulator and the second insulator are connected to each other.

The at least one heat dissipation hole may be arranged between the plurality of connection bosses, and be provided by cutting off spaces formed by the at least one reinforcing rib and the connection ribs.

In accordance with another aspect, in a washing machine which has a tub provided with a rear wall, a drum arranged in the tub, and a motor mounted on the rear wall of the tub to drive the drum and including a stator core and a first insulator and a second insulator arranged on the lower and upper surfaces of the stator core to surround the stator core, the first insulator includes a mounting unit including a plurality of connection bosses arranged in the circumferential direction of the first insulator and separated from each other so as to connect the first insulator to the tub, and a circular reinforcing rib to connect a support rib supporting a part of the inner surface of the stator core and the plurality of connection bosses, wherein at least one heat dissipation hole to dissipate heat of the stator core is provided on the mounting unit.

The stator core may include a ring-shaped base and teeth arranged along the outer circumferential surface of the base and separated from each other, and the second insulator may include a ring-shaped cover to cover the base and an inner diameter of the cover may be greater than an inner diameter of the reinforcing rib.

The tub may be provided with a plurality of guide protrusions protruded from the rear wall of the tub, the cover may be provided with a plurality of prominent parts protruded inwardly in the radial direction of the second insulator, and guide holes corresponding to the plurality of guide protrusions may be provided on the plurality of prominent parts.

The guide holes may be arranged at positions to be exposed to the outside through the at least one heat dissipation hole, if the first insulator and the second insulator are connected to each other.

The mounting unit may further include a plurality of positioning bosses arranged at positions adjacent to the plurality of connection bosses so as to be connected with the second insulator, and a circular reinforcing rib to connect the plurality of positioning bosses to each other.

The mounting unit may further include connection ribs to connect the support rib and the circular reinforcing rib connecting the plurality of connection bosses to each other and the circular reinforcing rib connecting the plurality of positioning bosses to each other, and the at least one heat dissipation hole may be arranged between the plurality of connection bosses and be provided by cutting off spaces formed by the circular reinforcing ribs and the connection ribs.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
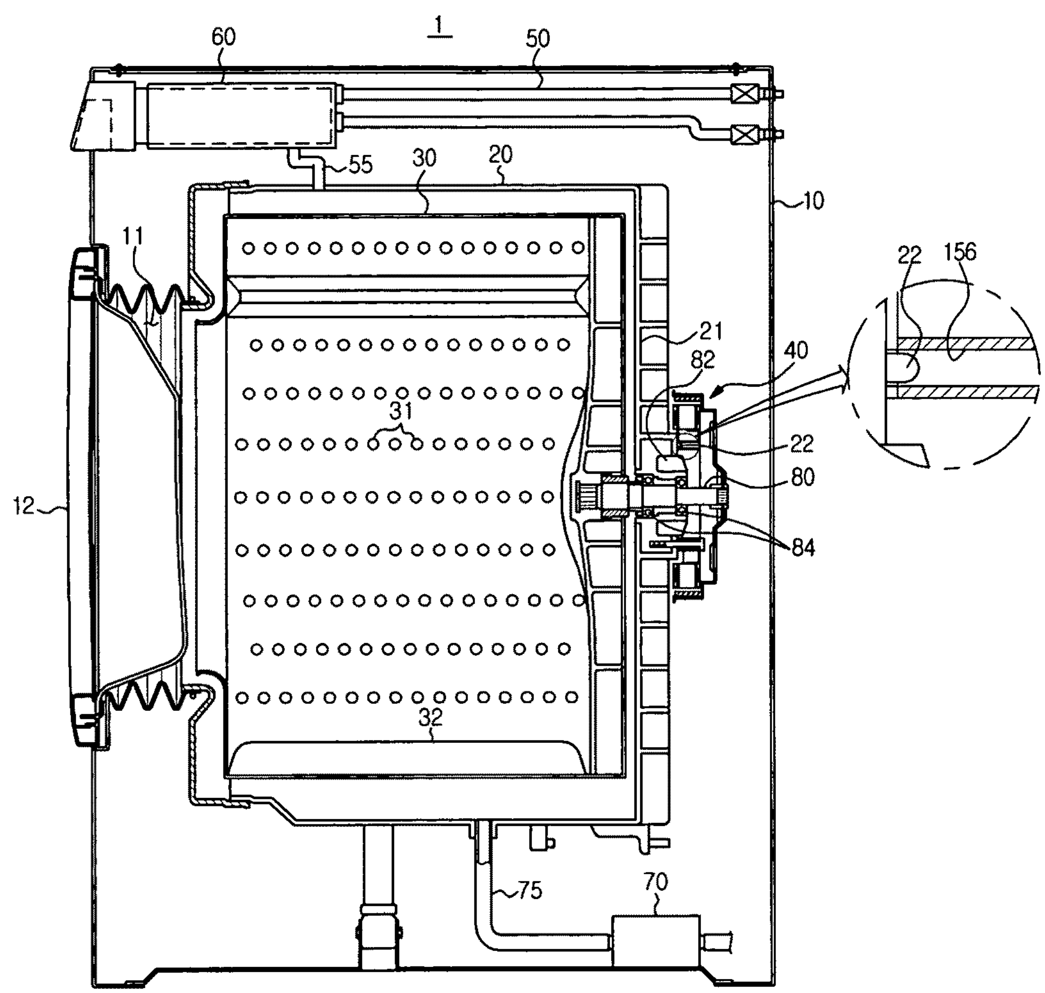
FIG. 1 is a washing machine in accordance with one embodiment.

Reference will now be made in detail to the embodiments, examples of which are illustrated in the accompanying drawings, wherein like reference numerals refer to like elements throughout.

FIG. 1 is a washing machine in accordance with one embodiment.

As shown in FIG. 1, a washing machine 1 in accordance with this embodiment includes a cabinet 10 forming an external appearance of the washing machine 1, a tub 20 arranged within the cabinet 10, a drum 30 rotatably arranged within the tub 20, and a motor 40 to drive the drum 30.

An inlet 11 through which laundry is put into the drum 30 is formed through the front surface of the cabinet 10, and the inlet 11 is opened and closed by a door 12 installed on the front surface of the cabinet 10.

A water supply pipe 50 to supply washing water to the tub 20 is installed above the tub 20.

One end of the water supply pipe 50 is connected to an external water supply source (not shown), and the other end of the water supply pipe 50 is connected to a detergent supply device 60.

The detergent supply device 60 is connected to the tub 20 through a connection pipe 55. Water supplied through the water supply pipe 50 is supplied to the inside of the tub 20 together with a detergent by way of the detergent supply device 60.

A drain pump 70 and a drain pipe 75 to discharge water in the tub 20 to the outside of the cabinet 10 are installed under the tub 20.

A plurality of through holes 31 to circulate washing water is formed through the circumferential surface of the drum 30, and a plurality of lifters 32 to raise and drop the laundry during rotation of the drum 30 is installed on the inner circumferential surface of the drum 30.

A driving shaft 80 is arranged between the drum 30 and the motor 40. The driving shaft 80 transmits rotary force of the motor 40 to the drum 30.

One end of the driving shaft 80 is connected to the drum 30, and the other end of the driving shaft 80 is extended to the outside of a rear wall 21 of the tub 20.

A bearing housing 82 rotatably supporting the driving shaft 80 is installed on the rear wall 21 of the tub 20.

The bearing housing 82 is made of aluminum alloy, and may be formed under the condition that the bearing housing 82 is inserted into the rear wall 21 of the tub 20 when the tub 20 is formed by injection molding.

Bearings 84 are installed between the bearing housing 82 and the driving shaft 80 so as to efficiently rotate the driving shaft 80.

Figure 2:
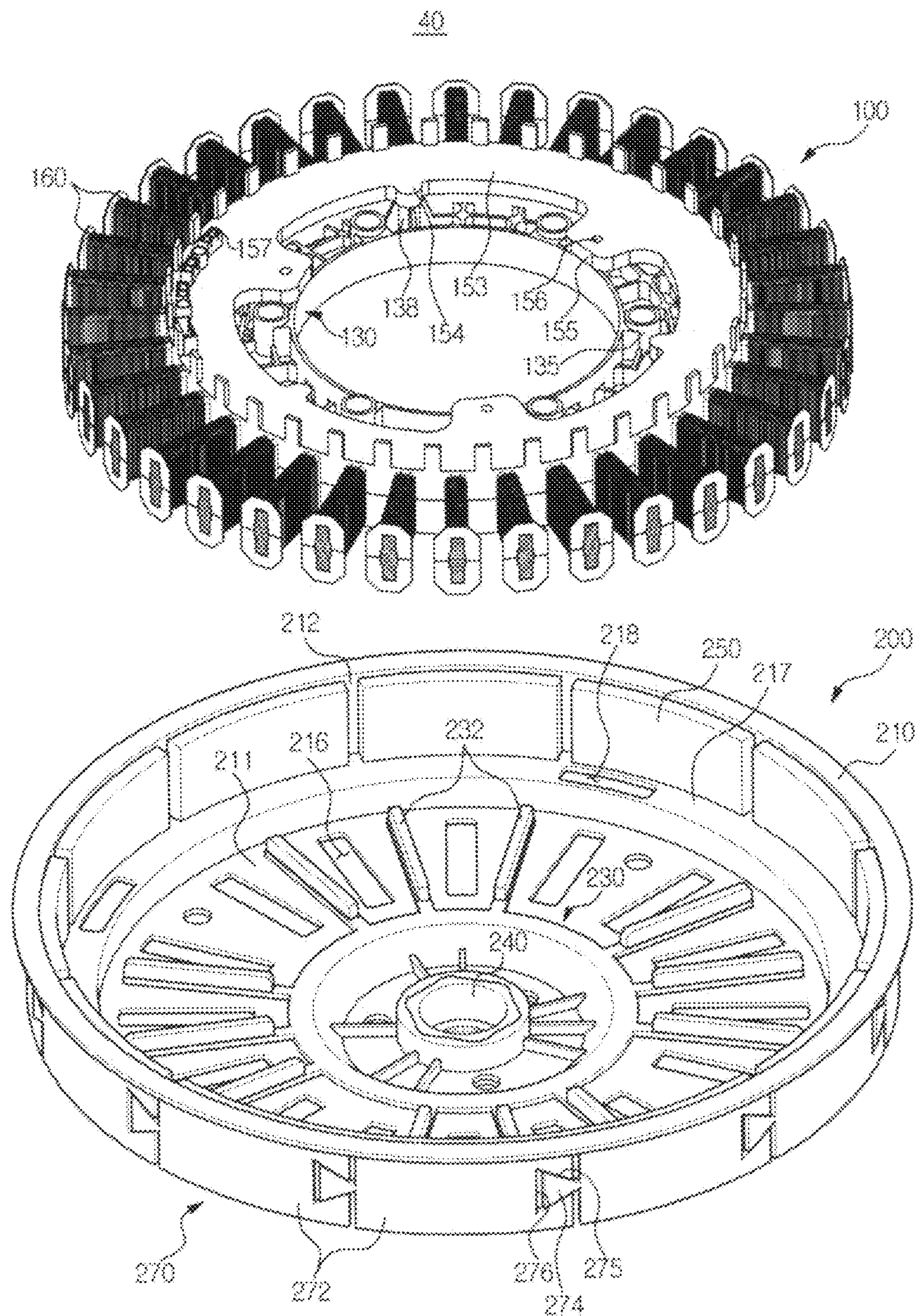
FIG. 2 is an exploded perspective view of a motor in accordance with the embodiment.
Figure 3:
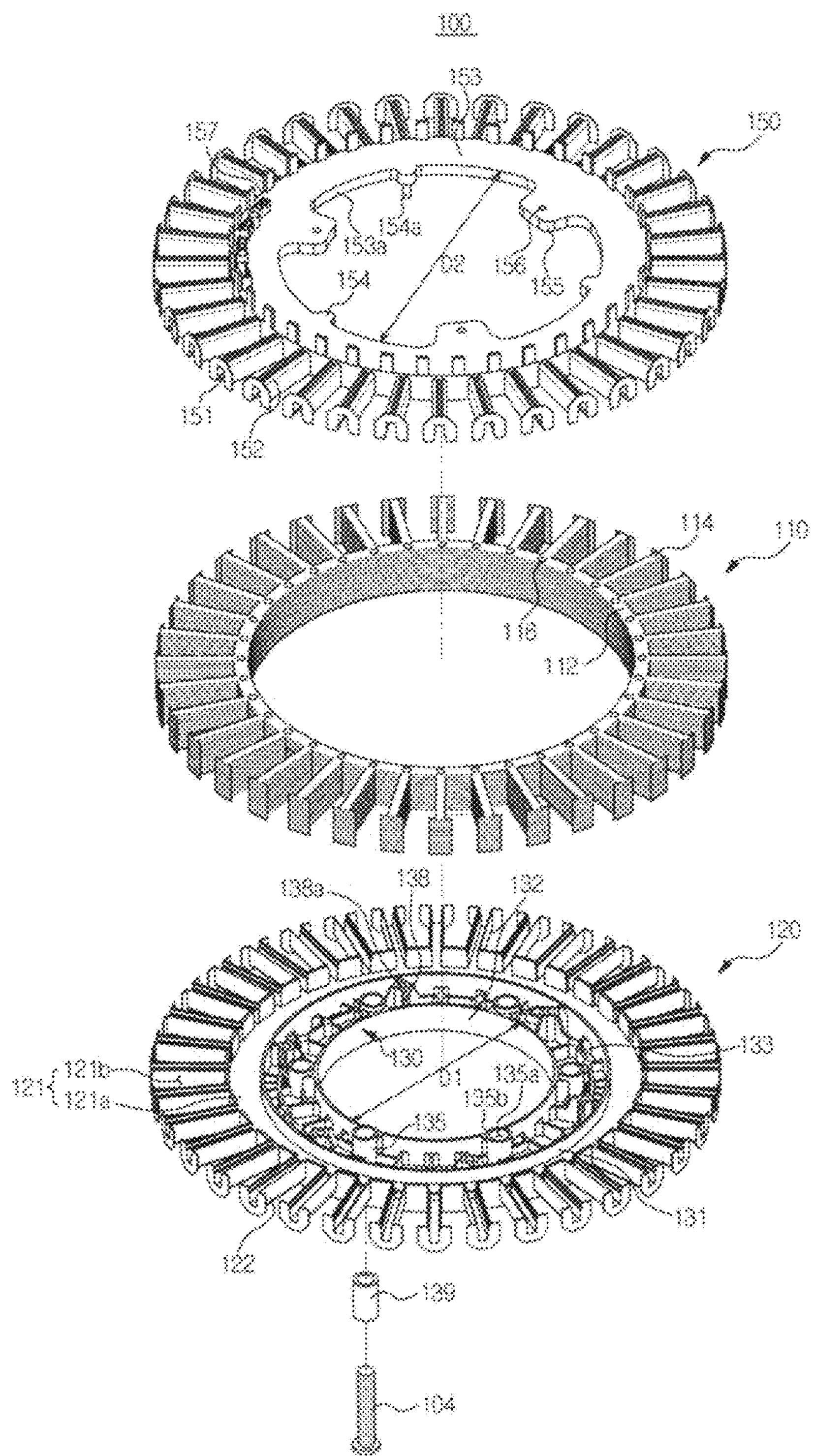
FIG. 3 is an exploded perspective view of a stator of the motor of FIG. 2.
Figure 4:
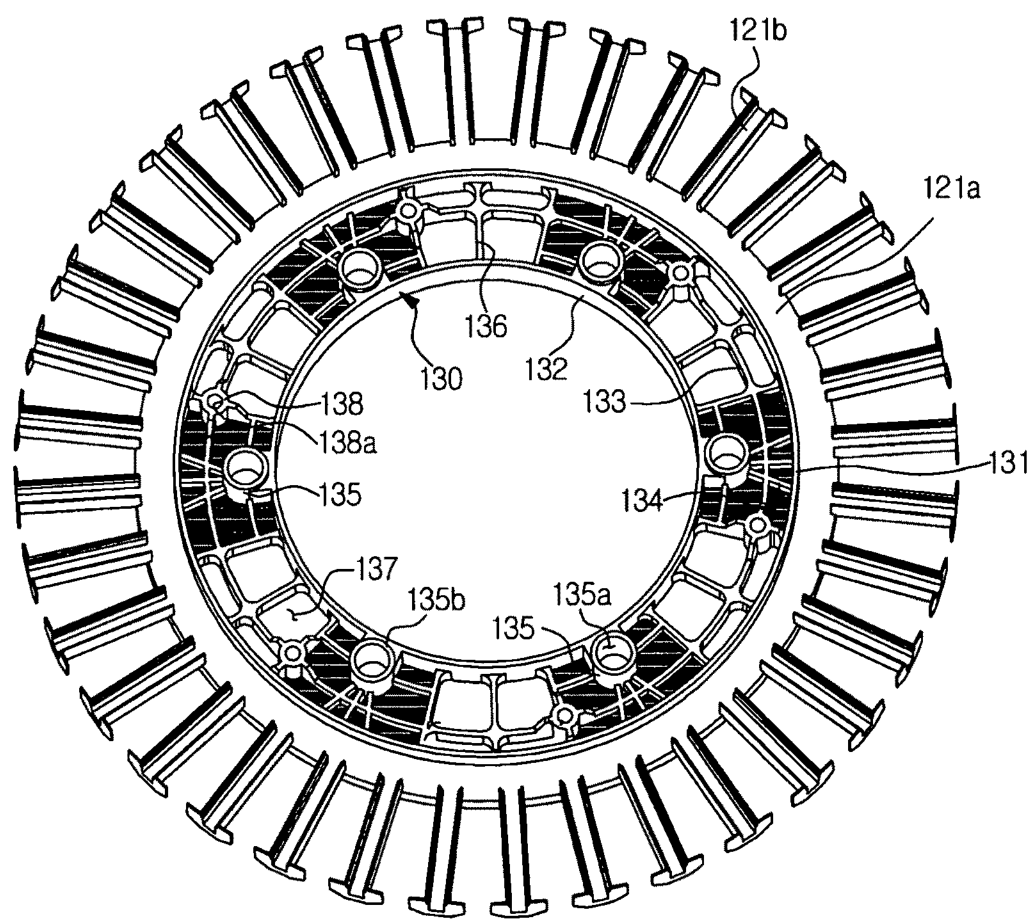
FIG. 4 is a view illustrating a first insulator of the stator of FIG. 3.

FIG. 2 is an exploded perspective view of the motor in accordance with the embodiment of the present invention, FIG. 3 is an exploded perspective view of a stator of the motor of FIG. 2, and FIG. 4 is a view illustrating a first insulator of the stator of FIG. 3.

As shown in FIG. 2, the motor 40 includes a stator 100 mounted on the rear wall 21 of the tub 20, and a rotor 200 arranged around the stator 100 and rotated through electromagnetic interaction with the stator 100.

The rotor 200 includes a rotor frame 210, and an injection-molded product 230 formed on the rotor frame 210 by injection molding.

The rotor frame 210 includes a bottom 211 and a side wall 212 protruded from the edge of the bottom 211, and is arranged so as to surround the stator 100.

The rotor frame 210 is made of a magnetic material, and is formed with a thickness of 1.6 mm or less in order to improve productivity and reduce material costs.

Air inlets 216 through which external air is introduced into the rotor frame 210 during rotation of the rotor 200 are formed through the bottom 211 of the rotor frame 210, and cooling blades 232 protruded to the inside of the rotor frame 210 are provided between the air inlets 216.

The side wall 212 of the rotor frame 210 includes a bending part 217 bent in a direction of extending the radius of the rotor frame 210, and magnets 250 are arranged on the inner surface of the side wall 212 above the bending part 217 in the circumferential direction of the rotor frame 210.

The magnets 250 are opposite to coils 160 of the stator 100 by a designated interval so as to electromagnetically interact with the stator 100.

Holes 218 are arranged on the bending part 217 of the side wall 212 in the circumferential direction of the rotor frame 210. A worker assembling the motor 40 with the tub 20 easily observes whether or not a proper interval between the stator 100 and the magnets 250 is uniformly maintained through the holes 218 formed through the bending part 217.

A back yoke ring 270 is connected with the outer surface of the side wall 212 of the rotor frame 210. The back yoke ring 270 serves to reinforce the side wall 212 of the rotor frame 210 as well as to prevent leakage of a magnet field of the magnets 250 and thus to improve the performance of the motor 40.

The back yoke ring 270 includes a plurality of unit yokes 272 arranged in the circumferential direction of the rotor frame 210. Each of the unit yokes 272 includes a connection protrusion 274 formed at one end thereof, and a connection hole 276 formed at the other end thereof.

The connection protrusion 274 includes inclined planes 275 so as to have a sectional area gradually increasing in the protruded direction thereof, and the connection hole 276 has a shape corresponding to the connection protrusion 274.

The connection protrusion 274 of one unit yoke 272 is connected to the connection hole 276 of a neighboring unit yoke 272. The unit yokes 272 are arranged in a ring shape, and are fixed to the outer surface of the side wall 212 through press fitting.

When the back yoke ring 270 is fixed to the side wall 212 through press fitting, the unit yokes 272 are slightly distant from each other so that the radius of the back yoke ring 270 is extended, and thus press fitting of the back yoke ring 270 to the side wall 212 is smoothly achieved.

Further, while the radius of the back yoke ring 270 is extended, the connection protrusions 274 of the unit yokes 272 are strongly engaged with the connection holes 276 of the unit yokes 272, and thus the back yoke ring 270 is firmly fixed to the side wall 212.

The injection-molded product 230 is formed on the bottom 211 of the rotor frame 210 by injection molding, and is integrated with the rotor frame 210.

A serration member 240 made of a metal, such as iron or aluminum alloy, is inserted into the center of the injection-molded product 230. The serration member 240 is connected with the end of the driving shaft 80 extended to the outside of the tub 20.

As shown in FIG. 3, the stator 100 includes a stator core 110, a first insulator 120 and a second insulator 150 respectively arranged on the lower and upper surfaces of the stator core 110 so as to surround the stator core 110, and the coils 160 (with reference to FIG. 2).

The stator core 110 includes a ring-shaped base 112, and teeth 114 arranged along the outer circumferential surface of the base 112 and protruded outwardly in the radial direction of the stator 100.

The stator core 110 may be obtained by forming unit cores by stacking iron panels, obtained by press processing, and then by connecting the unit cores in the circumferential direction.

Further, the stator core 110 may be obtained by rolling a band-shaped iron panel having the base 112 and the teeth 114 in a spiral shape.

Insertion holes 116 are arranged on the base 112 of the stator core 110 in the circumferential direction. Fastening members, such as pins or rivets, are inserted into the insertion holes 116, thereby connecting respective layers constituting the stator core 110.

The first insulator 120 and the second insulator 150 are made of an electrically insulating material, and are arranged on the lower and upper surfaces of the stator core 110 so as to cover the stator core 110.

When the stator 100 is mounted on the tub 20, the second insulator 150 is arranged adjacent to the rear wall 21 of the tub 20, and the first insulator 120 is arranged on one side of the stator core 110 opposite to the second insulator 150.

The first insulator 120 includes a core receiving unit 121 to receive the stator core 112, and a ring-shaped mounting unit 130 extended from the outer surface of the core receiving unit 121 inwardly in the radial direction of the first insulator 120 to mount the stator 110 on the tub 20.

The core receiving unit 121 includes a ring-shaped base receiving part 121*a* corresponding to the base 112 of the stator core 110, and first teeth receiving parts 121*b* corresponding to the teeth 114 of the stator core 110.

The second insulator 150 includes a ring-shaped cover 153 arranged on the upper surface of the base 112 of the stator core 110, and second teeth receiving parts 151 corresponding to the teeth 114 of the stator core 110.

When the first insulator 120 and the second insulator 150 are connected to each other, the stator core 110 is received in a space formed by the base receiving part 121*a*, the first teeth receiving parts 121*b*, the second teeth receiving parts 151, and the cover 153.

The first insulator 120 and the second insulator 150 are provided with first coil support parts 122 and second coil support parts 152.

Each first coil support part 122 and each second coil support part 152 forms one coil support unit, when the first insulator 120 and the second insulator 150 are connected to each other, and the coils 160 (with reference to FIG. 2) are wound on the respective coil support units.

An inner diameter D1 of the mounting unit 130 is smaller than an inner diameter D2 of the cover 153 so as to expose the mounting unit 130 of the first insulator 120 from the cover 153 of the second insulator 150 when the first insulator 120 and the second insulator 150 are connected to each other.

With reference to FIGS. 3 and 4, the mounting unit 130 is formed by a support rib 131 supporting one side wall of the base receiving part 121*a* to support the inner wall of the stator core 110 received in the core receiving unit 121, and circular reinforcing ribs 132 and 133 separated from the support rib 131 by designated intervals and formed in the circumferential surface of the first insulator 120.

A plurality of connection bosses 135 is provided on the mounting unit 130, the inner diameter D1 of which is smaller than the inner diameter D2 of the cover 153. Each connection boss 135 is provided with a connection hole 135*a*, into which a fastening member 104, such as a bolt, is inserted.

The connection bosses 135 are arranged so as to be separated from each other in the circumferential direction of the mounting unit 130. Each connection boss 135 is made of one member extended up to the rear wall 21 of the tub 20 in the axial direction of the motor 40 so that one end 135*b* of each connection boss 135 is supported by the rear wall 21 of the tub 20 when the stator 100 is fixed to the tub 20 by the fastening members 140.

A sleeve 139 is inserted into the connection hole 135*a* of each connection boss 135. The sleeves 139 are made of a metal. The sleeves 139 reinforce the connection bosses 135, thereby preventing damage to the connection bosses 135 due to the insertion process of the fastening members 104 or vibration transmitted from the tub 20 during the operation of the washing machine.

Further, the connection bosses 135 are connected to each other by the circular reinforcing rib 132 connecting the outer surfaces of the connection bosses 135, and the connection bosses 135 and the support rib 131 are connected to each other by radial reinforcing ribs 134.

Such reinforcing ribs 132 and 134 serve to maintain rigidity of the connection bosses 135 relative to fastening force and simultaneously to prevent changes in relative positions of the connection bosses 135.

Further, a plurality of positioning bosses 138 separated from each other in the circumferential direction of the mounting unit 130 is provided on the mounting unit 130, and each positioning boss 138 is provided with a positioning hole 138*a* formed therein.

The positioning bosses 138 are arranged adjacent to the connection bosses 135.

The positioning bosses 138 are extended in the axial direction of the motor 40, and are formed with a height lower than the connection bosses 135. Thereby, there is a height difference between the upper surfaces of the positioning bosses 138 and the upper surfaces of the connection bosses 135.

Further, the circular reinforcing rib 133 connecting the positioning bosses 138 to each other to reinforce the rigidity of the positioning bosses 138 is provided on the mounting unit 130.

The reinforcing rib 133 has a trajectory passing through the centers of the respective positioning bosses 138, thereby connecting the respective positioning bosses 138 to each other.

Further, connection ribs 136 connecting the support rib 131 and the reinforcing ribs 132 and 133 to each other are provided on the mounting unit 130.

The support rib 131 and the reinforcing ribs 132 and 133 are connected by the connection ribs 136 extended radially, thereby effectively preventing bending or warping of the first insulator 120.

Heat dissipation holes 137 to dissipate heat from the stator core 110 are provided on the mounting unit 130.

The heat dissipation holes 137 to dissipate heat from the stator core 110 function as air circulation passages through which external air is introduced into the base 112 of the stator core 110 received in the base receiving part 121*a*, thereby improving a cooling effect of the stator core 110.

The heat dissipation holes 137 are vertically formed through the mounting unit 130 between the plural connection bosses 135 separated from each other in the circumferential direction of the mounting unit 130. The heat dissipation holes 137 may be formed by cutting off spaces formed by the circular reinforcing ribs 132 and 133 and the connection ribs 136.

With reference to FIG. 2, the second insulator 150 includes the ring-shaped cover 153, the inner diameter D2 of which is larger than the inner diameter D1 of the mounting unit 130 of the first insulator 120, and the cover 153 is configured to cover the base receiving part 121*a* of the first insulator 120, the reinforcing rib 133, and the reinforcing ribs 133 connecting the positioning bosses 138 to each other.

A plurality of connection parts 154 protruded inwardly in the radial direction of the second insulator 150 to achieve assembly with the first insulator 120 is provided on an inner diameter part 153*a* of the cover 153.

The connection parts 154 are provided at positions corresponding to the positioning bosses 138 of the first insulator 120 when the first insulator 120 and the second insulator 150 are connected to each other.

Protrusions 154*a* extended downwardly in the axial direction of the motor 40 and inserted into the positioning holes 138*a* of the positioning bosses 138 are provided on the connection parts 154.

Thereby, when the first insulator 120 and the second insulator 150 are connected to each other, the protrusions 154*a* provided on the connection parts 154 of the second insulator 150 are inserted into the positioning holes 138*a* of the first insulator 120, thereby easily achieving assembly of the first insulator 120 and the second insulator 150.

Further, a plurality of prominent parts 155 protruded inwardly in the radial direction of the second insulator 150 to guide an assembly position of the stator 100 when the stator 100 is mounted on the tub 20 is provided on the inner diameter part 153*a* of the cover 153, and a guide hole 156 is provided on each prominent part 155.

Figure 5:
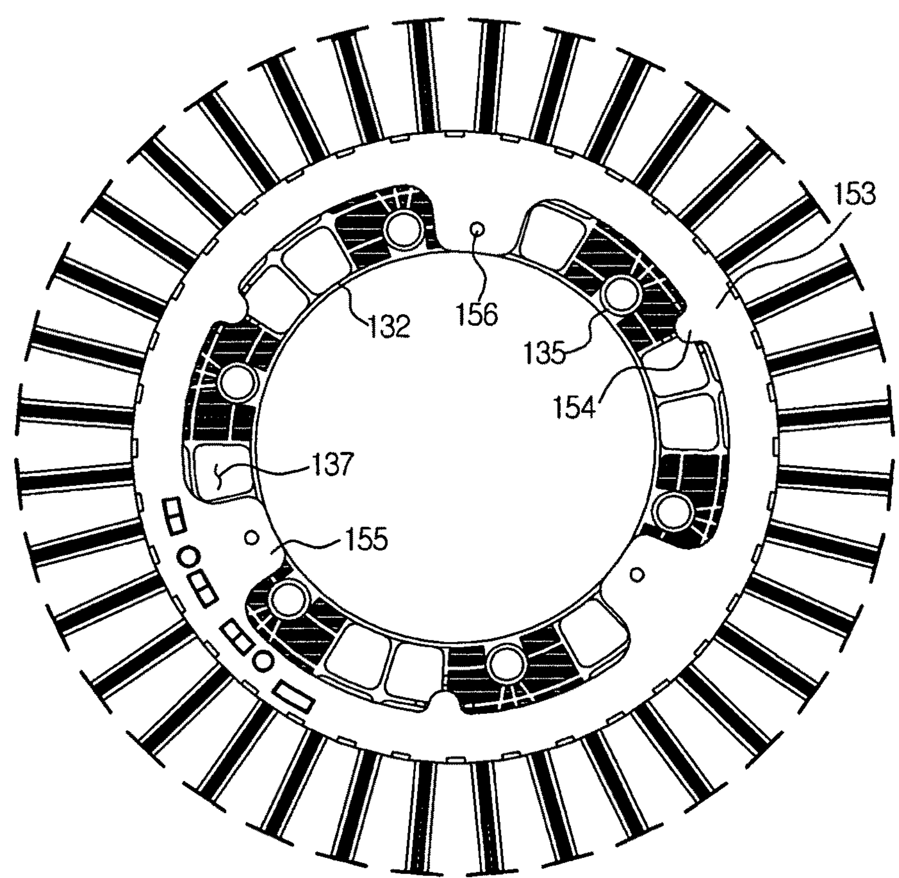
FIG. 5 is a top plan view of the stator of the motor of FIG. 2.

The prominent parts 155 are arranged so that the tips of the respective prominent parts 155 contact the upper end of the reinforcing rib 132 forming the inner diameter D1 of the mounting unit 130 of the first insulator 120, as shown in FIG. 5, when the first insulator 120 and the second insulator 150 are connected to each other.

Figure 6:
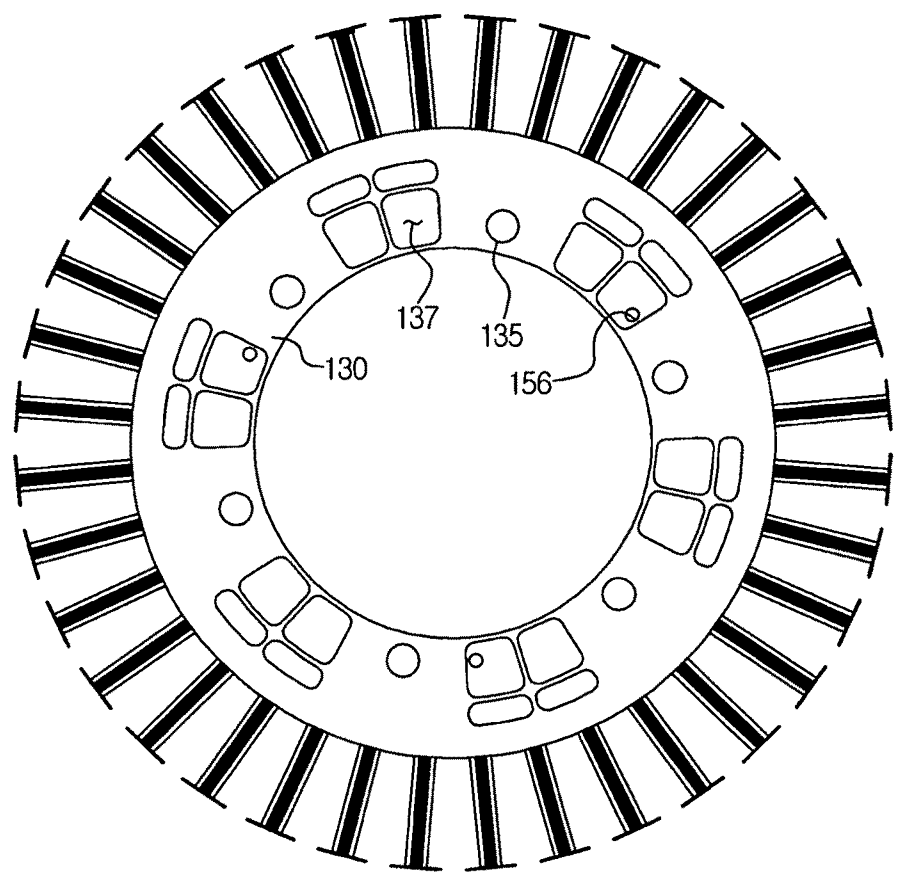
FIG. 6 is a bottom plan view of the stator of the motor of FIG. 2.

The guide holes 156 are arranged at positions exposed to the heat dissipation holes 137 so as to be recognized from the outside through the heat dissipation holes 137 formed through the mounting unit 130 of the first insulator 120, as shown in FIG. 6, when the first insulator 120 and the second insulator 150 are connected to each other.

Further, the guide holes 156 are arranged at positions corresponding to guide protrusions 22 provided on the rear wall 21 of the tub 20 so that the stator 100 is mounted at a correct position, as shown in FIG. 1.

Thereby, if the stator 100 is mounted on the tub 20, the positions of the guide holes 156 provided on the prominent parts 155 of the second insulator 150 are easily recognized through the heat dissipation holes 137 of the first insulator 120, and thus the guide protrusions 22 provided on the tub 20 are easily inserted into the guide holes 156, thereby facilitating fixation of the stator 100 to the tub 20.

Further, a power connection part 157 is provided on the second insulator 150 so as to supply power to the coils 160 of the stator 100.

As is apparent from the above description, a motor for washing machines in accordance with one embodiment improves cooling efficiency of a stator core.

Further, the motor for washing machines in accordance with the embodiment facilitates assembly of a stator with a tub as connection portions between the stator and the tub may be easily seen from the outside when the stator is fixed to the tub.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A motor for washing machines with a stator mounted on a tub of a washing machine, the stator comprising:

a stator core including a base and teeth arranged along the outer circumferential surface of the base and separated from each other;

a first insulator arranged on the lower surface of the stator core, and including a core receiving unit to receive the stator core, and a mounting unit extended from the core receiving unit inwardly in the radial direction of the stator to mount the stator on the tub and provided with at least one heat dissipation hole; and a second insulator arranged on the upper surface of the stator core, and including a cover to cover the base and teeth receiving parts corresponding to the teeth, wherein the mounting unit includes at least one reinforcing rib formed in the circumferential direction of the stator and connection ribs connected to the at least one reinforcing rib, and wherein the at least one heat dissipation hole is provided by cutting off spaces formed by the at least one reinforcing rib and the connection ribs.

2. The motor for washing machines according to claim 1, wherein an inner diameter of the cover is greater than an inner diameter of the mounting unit.

3. The motor for washing machines according to claim 1, wherein a length of the cover protruded inwardly in the radial direction of the stator is smaller than a length of the mounting unit protruded inwardly in the radial direction of the stator.

4. The motor for washing machines according to claim 1, wherein the mounting unit includes a plurality of connection bosses arranged in the circumferential direction of the mounting unit and separated from each other, and the plurality of connection bosses is extended up to the tub and supported by the tub when the stator is mounted on the tub.

5. The motor for washing machines according to claim 4, wherein the at least one heat dissipation hole is arranged between the plurality of connection bosses.

6. The motor for washing machines according to claim 1, wherein the core receiving unit includes a support rib to support the inner surface of the base; and the mounting unit further includes radial reinforcing ribs to connect the support rib and the plurality of connection bosses.

7. The motor for washing machines according to claim 6, wherein the connection ribs connect the support rib and the at least one reinforcing rib formed in the circumferential direction of the stator.

8. The motor for washing machines according to claim 4, wherein:

the mounting unit further includes a plurality of positioning bosses arranged at positions adjacent to the plurality of connection bosses so as to be connected with the second insulator; and connection parts connected with the plurality of positioning bosses are provided on the cover.

9. The motor for washing machines according to claim 4, wherein:

the tub is provided with a plurality of guide protrusions protruded from a rear wall of the tub; and a plurality of guide holes to receive the plurality of guide protrusions is provided on the cover.

10. A motor for washing machines with a stator mounted on a tub of a washing machine, the stator comprising:

a stator core including a base and teeth arranged along the outer circumferential surface of the base and separated from each other;

a first insulator arranged on the lower surface of the stator core, and including a core receiving unit to receive the stator core, and a mounting unit extended from the core receiving unit inwardly in the radial direction of the stator to mount the stator on the tub and provided with at least one heat dissipation hole; and a second insulator arranged on the upper surface of the stator core, and including a cover to cover the base and teeth receiving parts corresponding to the teeth, wherein the mounting unit includes a plurality of connection bosses arranged in the circumferential direction of the mounting unit and separated from each other, and the plurality of connection bosses is extended up to the tub and supported by the tub when the stator is mounted on the tub;

the tub is provided with a plurality of guide protrusions protruded from a rear wall of the tub;

a plurality of guide holes to receive the plurality of guide protrusions is provided on the cover; and the guide holes are exposed to the outside through the at least one heat dissipation hole, if the first insulator and the second insulator are connected to each other.

11. A washing machine comprising:

a tub provided with a rear wall;

a drum arranged in the tub; and a motor mounted on the rear wall of the tub to drive the drum and including a stator core and a first insulator and a second insulator arranged on the lower and upper surfaces of the stator core to surround the stator core, wherein the first insulator includes a mounting unit including a plurality of connection bosses arranged in the circumferential direction of the first insulator and separated from each other so as to connect the first insulator to the tub, and a circular reinforcing rib to connect a support rib supporting a part of the inner surface of the stator core and the plurality of connection bosses, wherein at least one heat dissipation hole to dissipate heat of the stator core is provided on the mounting unit;

the stator core includes a ring-shaped base, and teeth arranged along the outer circumferential surface of the base and separated from each other;

the second insulator includes a ring-shaped cover to cover the base, and an inner diameter of the cover is greater than an inner diameter of the reinforcing rib;

the tub is provided with a plurality of guide protrusions protruded from the rear wall of the tub;

the cover is provided with a plurality of prominent parts protruded inwardly in the radial direction of the second insulator, and guide holes corresponding to the plurality of guide protrusions are provided on the plurality of prominent parts; and the guide holes are arranged at positions to be exposed to the outside through the at least one heat dissipation hole when the first insulator and the second insulator are connected to each other.

12. The washing machine according to claim 11, wherein the mounting unit further includes a plurality of positioning bosses arranged at positions adjacent to the plurality of connection bosses so as to be connected with the second insulator, and a circular reinforcing rib to connect the plurality of positioning bosses to each other.

13. The washing machine according to claim 11, wherein:

the mounting unit further includes connection ribs to connect the support rib and the circular reinforcing rib connecting the plurality of connection bosses to each other and the circular reinforcing rib connecting the plurality of positioning bosses to each other; and the at least one heat dissipation hole is arranged between the plurality of connection bosses, and is provided by cutting off spaces formed by the circular reinforcing ribs and the connection ribs.

* * * * *

UNITED STATES PATENT AND TRADEMARK OFFICE

CERTIFICATE OF CORRECTION

PATENT NO. : 9,021,839 B2
APPLICATION NO. : 13/064691
DATED : May 5, 2015
INVENTOR(S) : Jong Jin Lee et al.

It is certified that error appears in the above-identified patent and that said Letters Patent is hereby corrected as shown below:

Title page

Item (75) Inventors, Line 1

Delete "Choonan-si" and insert --Cheonan-si--, therefor.

Signed and Sealed this
Thirteenth Day of October, 2015

Michelle K. Lee
*Director of the United States Patent and Trademark Office*